United States Patent [19]

McDowell et al.

[11] 4,254,088

[45] Mar. 3, 1981

[54] SALT-SODA SINTER PROCESS FOR RECOVERING ALUMINUM FROM FLY ASH

[75] Inventors: William J. McDowell; Forest G. Seeley, both of Oak Ridge, Tenn.

[73] Assignee: The United States of America as represented by the United States Department of Energy, Washington, D.C.

[21] Appl. No.: 24,339

[22] Filed: Mar. 27, 1979

[51] Int. Cl.³ .............................................. C01F 7/08
[52] U.S. Cl. .................................. 423/112; 423/111; 423/132
[58] Field of Search ................ 423/111, 112, 126, 132

[56] References Cited

U.S. PATENT DOCUMENTS

| | | | |
|---|---|---|---|
| 1,891,608 | 12/1932 | Scheidt | 423/131 |
| 2,174,825 | 10/1939 | Freling et al. | 423/132 |
| 3,320,032 | 5/1967 | Feller | 423/112 |
| 3,586,481 | 6/1971 | Hyde et al. | 423/112 |
| 3,816,590 | 6/1974 | Huska et al. | 423/112 |
| 4,032,613 | 6/1977 | Schultze et al. | 423/112 |

OTHER PUBLICATIONS

DeCarlo et al., "Dept. of Energy Report, ORNL/TM-6126", Oak Ridge National Lab., Oak Ridge, Tenn., Mar. 1978, 100 pp. (pp. 26-30 and 40-43 relied upon).

*Primary Examiner*—Herbert T. Carter
*Attorney, Agent, or Firm*—Irving Barrack; Stephen D. Hamel; James E. Denny

[57] ABSTRACT

A method for recovering aluminum values from fly ash comprises sintering the fly ash with a mixture of NaCl and $Na_2CO_3$ to a temperature in the range 700°–900° C. for a period of time sufficient to convert greater than 90% of the aluminum content of the fly ash into an acid-soluble fraction and then contacting the thus-treated fraction with an aqueous solution of nitric or sulfuric acid to effect dissolution of aluminum and other metal values in said solution.

2 Claims, 1 Drawing Figure

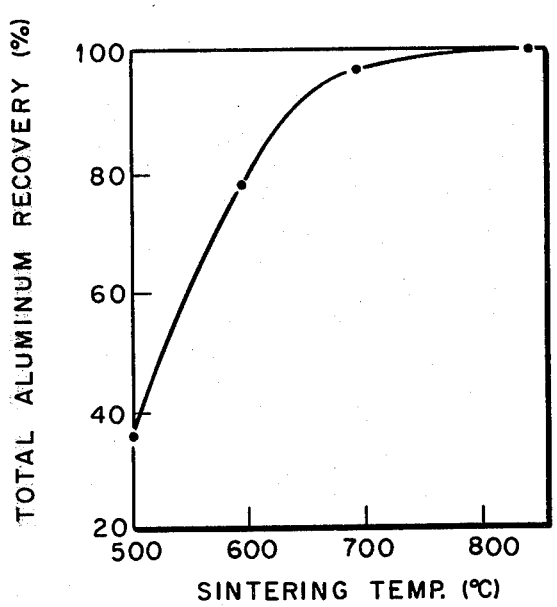
EFFECT OF SINTERING TEMPERATURE ON ALUMINUM RECOVERY IN THE SALT-SODA-SINTER PROCESS.

SALT-SODA SINTER PROCESS FOR RECOVERING ALUMINUM FROM FLY ASH

BACKGROUND OF THE INVENTION

This invention was made in the course of, or under, a contract with the United States Department of Energy. It relates to a method for recovering aluminum and other metal values from fly ash.

As used herein, the term "fly ash" is used to refer to the ash produced by and from the combustion of powdered or other particulate forms of coal in power station boilers or entrained ash carried over from a gasifier as typically recovered from flue gases or stacks, such as by electrostatic precipitation.

Structurally, fly ash comprises a mass of refractory glassy, non-crystalline micron-size spheroidal particles derived from coal that has been fired to a temperature of about 1750° C. While fly ash varies, depending on the coal source, a typical chemical composition of fly ash as derived from burning coal in a Tennessee Valley Authority steam plant is given in Table I below.

TABLE I
Analysis of Fly Ash From A TVA Steam Plant

| Constituent | wt. % | Constituent | wt. % |
|---|---|---|---|
| $SiO_2$ | 49.4 | Si | 23.1 |
| $Al_2O_3$ | 27.96 | Al | 14.8 |
| $Fe_2O_3$ | 10.77 | Fe | 7.53 |
| $MnO_2$ | 0.30 | Mn | 0.19 |
| CaO | 1.51 | Cu | 1.08 |
| MgO | 1.38 | Mg | 0.83 |
| $TiO_2$ | 1.68 | Ti | 1.01 |
| $K_2O$ | 3.14 | K | 2.61 |
|  |  | C | 2.6 |
| Minor Constituents, ppm | | | |
| Ba | 350 | Rb | 140 |
| Co | 50 | Sn | 25 |
| Cr | 120 | Sr | 750 |
| Cu | 130 | U | 15 |
| Ga | 50 | V | 180 |
| Ni | 80 | Zn | 200 |
| Pb | 60 | Zr | 270 |

In 1975, about 42 million tons of fly ash was generated from burning coal in power plants in the United States; and, in 1985, it is estimated that the fly ash generated in the utilization of coal for power and fuel production will increase to over 140 million tons. This taken in combination with the chemical analysis profile shown in Table I indicates that fly ash represents a significant and relatively cheap source inventory of aluminum and other valuable metals provided that technically efficient methods are available for their recovery. It is, therefore, a principal object of the present invention to teach and provide a novel and efficacious method for recovering aluminum as an oxide or salt from fly ash. An additional object is to provide a process which not only allows recovery of aluminum from fly ash but has sufficient flexible process parameters to allow efficient separation and recovery of other metal values contained therein, such as iron, titanium, thorium, and uranium. These and other objects are realized by reacting fly ash with a sintering medium comprising a mixture of sodium chloride and sodium carbonate with fly ash at a temperature and for a time sufficient to produce a water-insoluble, but acid soluble aluminum residue.

Acid leaching alone of the non-crystalline fly ash particles does not result in sufficient dissolution of aluminum. For example, an aqueous suspension of fly ash (i.e., one containing about 20 percent solids as fly ash) using 16 molar nitric acid in one case and up to 36 molar sulfuric acid in another will dissolve no more than about 10 percent of the aluminum contained in the fly ash at ambient temperatures, i.e., about 20° C. over a period of 72 hours. Greater amounts of aluminum are recovered by leaching under reflux conditions for extended periods of time; and even then no more than about half the aluminum is dissolved in the acid leachants. For example, using an acid such as $H_2SO_4$ at concentrations ranging from 3 to 36 normal over a 6-hour leaching time under reflux conditions, a maximum aluminum dissolution of only 54 percent has been achieved.

SUMMARY OF THE INVENTION

According to the present invention quantitative recovery of aluminum from fly ash is achieved by heating fly ash with a sintering medium comprising varying amounts of sodium chloride and soda (i.e., sodium carbonate, $Na_2CO_3$) sintering the salt-soda-ash mixture to a temperature in the range 500° C. to 900° C. for a time sufficient to produce a water-insoluble aluminum-containing fraction, dissolving the said water insoluble aluminum-containing fraction in an acid leachant and thereafter recovering a purified alumina product.

This invention is predicated on the discovery that certain effective mixtures of sodium chloride and soda, termed herein sintering medium, react with fly ash at elevated temperatures in such a manner as to produce an acid soluble aluminum-containing fraction from which virtually all of the aluminum contained in the fly ash can be recovered in purified form.

So-called sintering methods for the recovery of aluminum from fly ash are known. They are characterized by the production of water-soluble aluminates. In a so-called "lime sinter" process, lime (CaO added as $CaCO_3$) is reacted with fly ash at elevated temperatures to form a water-soluble calcium aluminate compound. A dilute sodium carbonate solution is used to dissolve the fly ash-lime sinter and the aluminum recovered by contacting the solution with $CO_2$ to form a precipitate of aluminum hydroxide product.

In a second "sintering" method, the reaction of mixtures of lime and soda ($Na_2CO_3$) with fly ash is known to produce a water-soluble sodium aluminate. As in the lime sinter process, the sintered lime-soda-fly ash mixture is leached with a dilute sodium carbonate solution. The resultant slurry is filtered and the resultant solution is treated with lime in an autoclave to precipitate any dissolved silica, which is then removed by settling and filtration. The desilicated aluminum trihydrate is then separated and can be converted to alumina by calcining.

The present invention differs from the aforementioned "sinter" methods by the use of a sinter medium-fly ash mixture to produce a water-insoluble aluminum salt which can be selectively dissolved in an acidic medium from which not only the aluminum but other valuable metal components of fly ash, such as uranium, thorium, titanium and iron, may be effectively separated and the aluminum converted to a purified alumina product.

According to the present invention, a salt-soda sintering medium at a salt-to-soda ratio ranging from 1.0 to 3.0 is mixed with fly ash at a sintering medium to ash ratio ranging from 1.0 to 3.0 is heated to a sintering temperature in the range 500°-900° C. and then leached with aqueous solutions of nitric or sulfuric acid.

Maximal recovery of aluminum into acid-soluble form is a sensitive function of several variables including N nitric acid or 1-2 N sulfuric acid. The results of a series of such tests are summarized in Table II below.

TABLE II

Sintering conditions: fusion mixture contained 3 parts of NaCl—Na$_2$CO$_3$ (2:1) to 1 part of fly ash; programmed temperature increase of initial 600° C./hr followed by 100° C./hr; 2 hr at maximum temperature. Leaching time, 3 to 5 hr.

| Initial wt of fly ash (g) | Sintering temp. (°C.) | First leach | | | | | Second leach | | | | |
|---|---|---|---|---|---|---|---|---|---|---|---|
| | | Leaching agent | Temp. (°C.) | Vol. (ml) | Residue wt (g) | Al leached (%) | Leaching agent | Temp. (°C.) | Vol. (ml) | Residue wt (g) | Al Leached (%) |
| 25 | 850 | 2 N H$_2$SO$_4$ | 90 | 1000 | 23.1 | 97 | | | | | |
| 25 | 850 | 2 N H$_2$SO$_4$ | 85 | 1000 | 5.1 | 99.9 | | | | | |
| 25 | 850 | H$_2$O | 85 | 1000 | 33.2 | 0.5 | 1 N HNO$_3$ | 85 | 1000 | 6.5 | 98.7 |
| 25 | 850 | 1 M Na$_2$CO$_3$ | 85 | 1000 | 30.7 | 0.6 | 1 N HNO$_3$ | 85 | 1000 | 0.7 | 99.9 |
| 25 | 850 | 1 M NaOH | 85 | 1000 | 30.5 | 13.0 | 1 N HNO$_3$ | 85 | 1000 | 0.6 | 99.9 |
| 25 | 500 | H$_2$O | 85 | 1000 | 24.3 | 0.1 | 1 N HNO$_3$ | 85 | 1000 | 19.6 | 36.4 |
| 25 | 600 | H$_2$O | 85 | 1000 | 28.0 | 0.1 | 1 N HNO$_3$ | 85 | 1000 | 11.8 | 77.6 |
| 25 | 700 | H$_2$O | 85 | 1000 | 30.6 | <0.1 | 1 N HNO$_3$ | 85 | 1000 | 11.5 | 96.7 |
| 50$^a$ | 700 | H$_2$O | 85 | 1000 | 66.5 | <0.1 | 1 N HNO$_3$ | 85 | 1000 | 49.5 | 68.4 |
| 25 | 850 | H$_2$O | 85 | 1000 | 34.0 | 0.5 | 1 N HNO$_3$ | 100 | 1000 | 16.2 | 97.5 |
| 25 | 850 | H$_2$O | 85 | 1000 | 34.6 | 0.4 | 1 N HNO$_3$ | 100 | 1000 | 17.3 | 97.6 |
| 25 | 850 | H$_2$O | 85 | 1000 | 33.5 | 0.4 | 1 N H$_2$SO$_4$ | 100 | 1000 | 15.9 | 97.4 |

$^a$Ratio of sintering medium to fly ash: 1.5/1.

ing the ratio of the NaCl/Na$_2$CO$_3$ sinter medium, the ratio of sinter medium/fly ash, and temperature of sintering and time at sintering temperature.

When the sintering medium NaCl/Na$_2$CO$_3$ weight ratio is less than 1, aqueous-soluble aluminum salts are not formed. NaCl/Na$_2$CO$_3$ ratios greater than 3 are unnecessary because maximum aluminum recovery in a water-insoluble, acid-soluble form will have already been obtained at NaCl/Na$_2$CO$_3$ ratios in the range 1–3. The ratio of sinter medium to fly ash also has a fairly narrow range of practicability. Thus at any given sinter medium (in the NaCl/Na$_2$CO$_3$ ratios of 1–3), the minimum sinter medium to fly ash ratio which can be used to produce a water-insoluble, acid-soluble aluminum product is 1. Maximum reactivity to create a desired water-insoluble, acid soluble aluminum is achieved at sinter medium to fly ash ratios of 3. Greater ratios of sinter medium to fly ash are not accompanied by further increases in the desired water-insoluble, acid-soluble aluminum.

The effect of varying the sintering temperature on production of acid-soluble aluminum using the disintegrated sintering medium at the recommended sintering medium to fly ash ratios is shown in the curve of the accompanying figure. It is seen that greater than 90% and up to 99% of the aluminum can be recovered at sintering temperatures in the range 650°–900° C. with no substantial benefit achieved beyond about 1000° C. Time at sintering temperature may vary from 1 to 4 hours but generally a sintering time sustained for about 2 hours will maximize recovery of the aluminum in acid-soluble form.

REPRESENTATIVE EMBODIMENT

A typical procedure for solubilizing aluminum values is given below. Three parts of sinter medium (consisting of 2 parts by weight sodium chloride, and 1 part sodium carbonate) was mixed with 1 part fly ash and heated in air to a temperature of 400° C. in one hour followed by incremental increases in temperature at a rate of 100° C./hour. Mixtures were maintained at a temperature in the range 500°–850° C. for 2 hours at the maximum temperature. The sintered mixtures were then cooled, ground to powder having particle sizes in the range 100 to 500 microns, and then subjected to a two-step leach, first in hot water, followed by leaching of the undissolved residue with fairly dilute aqueous solutions of 1 N nitric acid or 1-2 N sulfuric acid.

From Table II it will be seen that regardless of sintering temperatures, the aluminum contained in the sinter mix hardly dissolved (averaging less than 0.5%) in hot water. On the other hand, leaching with dilute acid results in dissolution of virtually all of the aluminum at a sintering medium/fly ash ratio greater than 1.5 and a sintering temperature of at least 900° C. Although formation of a soluble sodium aluminate was expected to have formed based on analogous chemistry involved in the lime sinter process, we found that the aluminum is virtually insoluble in hot water and only slightly soluble even in basic solutions. According to our invention, we take advantage of the water-insolubility of the aluminum-containing sinter to separate the aluminum from the unreacted sintering medium components NaCl-Na$_2$CO$_3$ which can then be reconstituted and reused.

Reaction of either component of the sintering medium, NaCl or Na$_2$CO$_3$ with fly ash at elevated temperatures up to 1000° C. results in an aqueous-soluble form of aluminum, but the reaction is not quantitative.

In order to determine the effects of the individual components of the salt sinter medium on the recovery of aluminum from fly ash, a mixture of 50 g NaCl and 25 g fly ash was heated to 850° C. in the same manner as in the NaCl-Na$_2$CO$_3$ sinter tests. After the sintered NaCl-fly ash was successively leached with 1 M Na$_2$CO$_3$ at 85° C. and 1 N HNO$_3$ at 85° C., the aluminum recovered was found to be only 27%. similarly treated sample, leached first with 1 M NaOH and then 1 N HNO$_3$ resulted in 45% dissolution of the aluminum content in the original fly ash sample.

Sintering fly ash with Na$_2$C0$_3$ in a 1:1 mixture at 850° C. for 2 hours followed by leaching with 1 N Na$_2$CO$_3$ at 85° C. followed by 1 N HNO$_3$ at 85° C., solutions resulted in dissolution of 66% of the aluminum contained in the fly ash. A similarly sintered sample leached cessively with hot water and then with a hot 1 N HNO$_3$ solution resulted in dissolution of only 47% of the aluminum in the fly ash.

The nitric acid leachant solutions which result from dissolution of the salt-soda-fly ash sintered mass provide an excellent feed solution for separating aluminum from other metal values contained in the solution by liquid-liquid solvent extraction techniques.

Thus, we have found that a 50 weight percent solution of di(2-ethylhexyl) phosphoric acid dissolved in diethylbenzene in contact with 5 volumes of an aqueous nitric acid leachant derived from dissolution of the water insoluble fraction of a salt-soda-fly ash sintered mass using a 5-stage cascade, with a contact time of 30 minutes/stage results in extraction of virtually all of the iron and titanium and 95% of the uranium and thorium contained in the nitric acid leachant. The aqueous raffinate, consisting of an aluminum nitrate solution, can then be filtered to remove insolubles and then the resultant aluminum nitrate can be crystallized by evaporation of the solution and decomposed by calcination to a refined alumina product.

The Fe, Ti, Th and U values can be stripped from the organic phase with a 1 M $Na_2CO_3$ solution. The U and Th will remain in solution as soluble carbonates while the Fe and Ti are precipitated and separated as insoluble hydroxides. Acidification of the resultant U and Th-containing filtrate with sulfuric acid to a solution pH of 1 to 2 produces a feed solution from which the U can be selectively extracted with an N-benzyl-secondary amine, such as N-benzyl-(1-undecyldodecyl) amine dissolved in a suitable inert organic diluent. Thereafter, the uranium can be stripped with a dilute sodium carbonate solution to produce a uranyl carbonate product solution. Thence, the uranium can be decomposed to a uranium oxide product. The thorium sulfate raffinate solution is treated with sodium hydroxide to recover thorium hydroxide and thence recovered as a thorium oxide product by decomposition. The Fe, Ti hydroxide precipitate can be separated by dissolving it in 5–6 M $H_2SO_4$ from which the Fe is selectively extracted into a trialkyl phosphine oxide, such as trioctyl phosphine oxide dissolved in an inert organic diluent.

What is claimed is:

1. A method for recovering aluminum values from fly ash which comprises sintering the fly ash with a mixture of NaCl and $Na_2CO_3$ at a weight ratio of $NaCl/Na_2CO_3$ and at a sintering medium to fly ash weight ratio of at least 1 to a temperature in the range 700°–900° C., mixing the sintered mixture with water to selectively dissolve NaCl and $Na_2CO_3$ and produce a water-insoluble aluminum fraction and then contacting the aqueous insoluble aluminum fraction with an aqueous solution of nitric or sulfuric acid to effect dissolution of aluminum and other metal values in said solution.

2. The method according to claim 1 in which the sintered $NaCl$-$Na_2CO_3$-fly ash medium is treated with water to dissolve NaCl and $Na_2CO_3$ and the resultant aluminum-insoluble fraction is dissolved in a dilute solution of nitric acid, contacting said fraction with an organic phase consisting of di(2-ethylhexyl) phosphoric acid dissolved in an inert organic medium to selectively extract nitric acid-soluble metal values except for aluminum, and then disengaging the resultant aluminum-containing raffinate and converting said raffinate to a purified alumina product.

* * * * *